(12) United States Patent
Bier

(10) Patent No.: US 7,782,062 B2
(45) Date of Patent: Aug. 24, 2010

(54) METHOD FOR LOCATING LEAKS IN PIPES

(76) Inventor: Günther Bier, Dresdner Strasse 49/5/4, A-1200 Wien (AT)

( * ) Notice: Subject to any disclaimer, the term of this patent is extended or adjusted under 35 U.S.C. 154(b) by 74 days.

(21) Appl. No.: 11/988,772

(22) PCT Filed: Jul. 7, 2006

(86) PCT No.: PCT/EP2006/064005
§ 371 (c)(1), (2), (4) Date: Jan. 14, 2008

(87) PCT Pub. No.: WO2007/006747
PCT Pub. Date: Jan. 18, 2007

(65) Prior Publication Data
US 2009/0115433 A1     May 7, 2009

(30) Foreign Application Priority Data
Jul. 13, 2005    (AT) .............................. A 1180/2005

(51) Int. Cl.
G01R 31/08 (2006.01)
G01R 27/08 (2006.01)

(52) U.S. Cl. ...................................... 324/525; 324/693
(58) Field of Classification Search ................. 324/525, 324/512, 500, 71.1, 559, 718, 527, 555, 693, 324/691, 71.2, 76.11
See application file for complete search history.

(56) References Cited

U.S. PATENT DOCUMENTS

| | | | |
|---|---|---|---|
| 3,721,898 A * | 3/1973 | Dragoumis et al. ......... | 324/693 |
| 5,279,148 A | 1/1994 | Brandes | |
| 5,381,097 A * | 1/1995 | Takatori et al. ............. | 324/512 |
| 6,265,880 B1 * | 7/2001 | Born et al. .................. | 324/541 |
| 7,042,235 B2 | 5/2006 | Strackbein et al. | |

FOREIGN PATENT DOCUMENTS

| | | |
|---|---|---|
| DE | 32 25 742 | 2/1983 |
| DE | 32 32 211 | 3/1984 |
| DE | 40 15 075 | 11/1991 |
| DE | 44 25 551 | 2/1996 |
| DE | 195 44 391 | 5/1997 |
| DE | 103 36 679 | 3/2005 |
| JP | 56-079229 | 6/1981 |
| JP | 58-26239 | 2/1983 |

OTHER PUBLICATIONS

International Search Report.

* cited by examiner

*Primary Examiner*—Hoai-An D Nguyen
(74) *Attorney, Agent, or Firm*—Collard & Roe, P.C.

(57) ABSTRACT

Method for establishing and possibly locating leaks in pipelines (1) for transporting liquid or gaseous media using at least one electrical conductor (2) running along the longitudinal extension of the pipeline (1) from a starting point to an end point. Accordingly, a defined test voltage ($U_m$, $U_L$) is applied between two electrical conductors (2) or between one electrical conductor 92) and the pipeline (1), and the resistance and/or impedance behavior between starting point and end point of the two conductors (2) or the conductor (2) and the pipeline (1) is ascertained with intact pipeline (1), and at later times, the resistance and/or impedance behavior is ascertained at the same test voltages ($U_m$, $U_L$) and compared to the resistance and/or impedance behavior known for the intact pipeline (1), the presence of a leak being thusly ascertained.

6 Claims, 4 Drawing Sheets

METHOD FOR LOCATING LEAKS IN PIPES

CROSS REFERENCE TO RELATED APPLICATIONS

Figure 1:
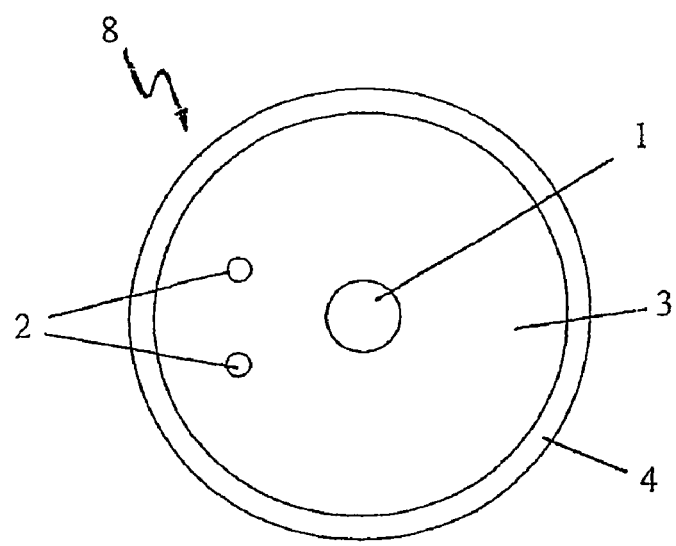

Applicant claims priority under 35 U.S.C. §119 of Austrian Application No. A 1180/2005 filed Jul. 13, 2005. Applicant also claims priority under 35 U.S.C. §365 of PCT/EP2006/064005 filed Jul. 7, 2006. The international application under PCT article 21(2) was not published in English.

The present invention relates to a method for establishing and possibly locating leaks in pipelines for transporting liquid or gaseous media using at least one electrical conductor running along the longitudinal extension of the pipeline from a starting point to an end point according to the preamble of Claim 1.

Pipelines for transporting liquid or gaseous media are widely distributed and typically led underground. These are waterline pipes or district heating pipes, for example, the transport media also being able to be provided as a gas in the form of water steam in the latter. To keep the escape of the medium and, in the case of district heating lines, the energy loss because of leaks as small as possible, the most rapid possible recognition of these leaks is necessary. To then minimize the work and cost outlay for repairing the damage, it is additionally desirable to also locate these leaks as precisely as possible.

Various methods are known for establishing and locating leaks. One possibility, for example, comprises measuring the time echo of pulsed test signals in electrical monitoring conductors, which are laid in proximity to the pipeline. For this purpose, for example, the pipeline in which the medium is transported is enveloped by a plastic sheath in which the electrical conductors are embedded in foam. The plastic sheath is in turn provided with a water-impermeable protective envelope. This configuration is also referred to in the following as a pipe composite. The dampening of the plastic sheath occurring because of the escape of the transport medium reduces the insulation resistance between pipeline and electrical monitoring conductor and/or between the monitoring conductors, and thus represents a low-resistance point at which the voltage pulse is reflected. The distance of the leak from the location of the coupling in of the test signal may be concluded from the runtime of the echo. Even if corresponding low-resistance conductors, such as copper wires, are used, a leak may first be reliably located upon relatively strong dampening and thus upon comparatively long exit of the medium from the pipe. In addition, the evaluation and interpretation of the time echo proves to be complex and difficult.

DE 44 25 551 relates to such a method based on measuring the time echo of pulsed test signals, signals from measurements with a pipeline known to be intact being compared to later measurements. JP 58-26239 also relates to a method of this type, in which pulses are used.

A further possibility for establishing a leak essentially comprises using a resistance measuring bridge. For this purpose, the electrical resistance between a high-resistance conductor, such as a nickel-chromium conductor, and a low-resistance conductor, such as a copper wire or the conductive pipe, is monitored. Upon dampening of the plastic sheath of the pipe by escape of the transport medium, the insulation resistance is in turn reduced, the leak being located according to the principle of the unloaded voltage divider. For this purpose, a threshold value is defined for the electrical resistance, an alarm signal being generated and the locating being performed if the resistance falls below this threshold value. This method proves to be sensitive enough to be able to detect even slight resistance changes, and thus allow a rapid fault location ascertainment. However, it has proven in practice that this method generates an unacceptably high number of false alarms, so that the maintenance costs of the pipeline section are increased because of finally unnecessary construction interventions.

It is therefore the object of the present invention to make the establishment and possibly location of leaks in pipelines more reliable, in order to in this way not only improve the monitoring of pipelines, but rather also minimize the maintenance costs. These objects are achieved by the features of the present invention.

The present invention is based on the consideration that the resistance behavior of the overall system made of pipeline, electrical monitoring conductor, their connection points, the separating filler material, and the voltage sources and voltage measuring devices is not constant during the operating time of the pipeline section, although the pipeline in which the medium is transported is still intact. Rather, in the course of damage to the pipe composite and the humidity entry from outside the pipe composite connected thereto, or also because of temperature changes, for example, variations of the degree of humidity inside the pipe composite occur without the pipeline being damaged. Furthermore, impairments may also occur in the overall electricity of the monitoring conductor, for example, in the connection points of the conductor, which cause an apparent reduction of the insulation resistance because of a reduction of the volume resistance. If the integrity of the pipeline is judged on the basis of a comparison to a previously defined threshold value, and in particular on the basis of the detection of the resistance falling below this threshold value, a leak may incorrectly be indicated, although the pipeline is still intact.

A further consideration is that the interpretation of a leak as a mere short-circuit point is too limited. The present invention is rather based on the viewpoint that the filler material separating the at least one monitoring conductor and the pipeline represents a dielectric material, which changes in the course of the operating time, having complex electrolytic and sometimes electrical properties. Therefore, the measurement of a mere resistance value and its comparison to a threshold value are not the focus of the observations, but rather the "resistance behavior" of the overall system is studied. Specifically, it has been shown that creeping resistance changes because of factors other than a leak may definitely be differentiated from changes because of actual leaks.

The invention thus relates to a method for establishing and possibly locating leaks in pipelines for transporting liquid or gaseous media using at least one electrical conductor running along the longitudinal extension of the pipeline from a starting point to an end point, according to the present invention, a defined test voltage in the form of a DC or AC voltage being applied between two electrical conductors or between one electrical conductor and the pipeline, and the resistance and/or impedance behavior between starting and end points of the two conductors or the conductor and the pipeline being ascertained at multiple DC voltage values and/or multiple AC voltage amplitudes or frequencies and with an intact pipeline, and the resistance and/or impedance behavior being ascertained at the same test voltages at later times and being compared to the resistance and/or impedance behavior known for the intact pipeline, the presence of a leak being concluded from the deviations of the resistance and/or impedance behavior ascertained at later times from that for the intact pipeline.

In contrast to known methods, a measured resistance value is thus not compared to a threshold value, but rather the observed resistance and/or impedance behavior is compared to that with an intact pipeline. The ascertainment of the resistance and/or impedance behavior between starting and end points of the two conductors or the conductor and the pipeline with intact pipeline not only comprises the mere ascertainment of a resistance value at a specific DC voltage value, but rather may also comprise the ascertainment of resistance values at multiple DC voltage values, or the impedances at multiple AC voltage amplitudes and frequencies. Furthermore, also incorporating experiential values which are obtained in the course of the operating time of the pipeline section during the ascertainment of the resistance and/or impedance behavior with intact pipeline is not precluded, for example, if cyclic changes or a gradual change of the resistance and/or impedance behavior is observed. Thus, for example, those cases of a false alarm may be discarded in which a resistance value does fall below a threshold value established in the scope of current methods, but it is clear from the comparison to the resistance behavior with intact pipeline that the change of the resistance value is to be attributed to other factors.

A further advantage of the method according to the present invention is that during the comparison to the resistance and/or impedance behavior with intact pipeline, multiple test voltages may also be used, which is not possible when merely monitoring a threshold value. A testing program, in which, for example, resistance and/or impedance values, i.e., the "resistance and/or impedance behaviors", are ascertained and analyzed at different voltage values and frequencies, may be automatically performed at fixed time intervals.

The invention provides that for the case of an AC voltage as the test voltage, the impedance behavior is measured at both the starting point and also the end point of the at least one electrical conductor. Precise location of the leak is thus made possible. If the resistance and/or impedance behavior is only measured at the starting or end point of the electrical conductor, the leak may only be located with restricted precision, so that in this case one is primarily restricted to establishing a leak.

A concrete procedure for measuring the impedance behavior is suggested as follows:
 a first test voltage is generated and coupled in as the first feed signal at the starting point of a monitoring conductor,
 a first response signal is measured at the end point,
 a second test voltage, corresponding to the first test voltage, is generated as a function of the first response signal and coupled in at the end point of a monitoring conductor as the second feed signal,
 a second response signal is measured at the starting point,
 and the correlation of the feed and response signals to the particular test voltages is compared to that for the intact pipeline.

An impedance behavior ascertained in this way is also referred to in the following as the jump or pulse response of the pipe composite. Instead of the expression "test voltage", the term "test signal" is also used in the following.

Such a procedure may particularly be performed according to the invention in the scope of a testing program using different test signals. For example, different frequencies, voltage amplitudes, pulse times, or pulse patterns may be coupled in within one sequence of the test program and the corresponding response signals may be analyzed. The testing program may be repeated at predefined time intervals. The repetition of a measurement with variation of the test signal allows a possibly occurring leak to be located more and more precisely.

According to the present invention, the impedance between two electrical conductors or between one electrical conductor and the pipeline may be ascertained with the aid of defined test voltages using different frequencies in each case, and its frequency dependence may be compared to that with intact pipeline. In this way, it is also possible to locate the leak, it being assumed here that the medium escaping from a leak causes a capacitance change in the area of the leak to the surrounding ground. The ground represents a known variable, the changes in the mass ratio at the location of the leak caused by the leak resulting in a change of the impedance conditions.

Impedance detection over a sufficiently large frequency range places special requirements on the test signal, a signal generator having a correspondingly high peak output being required in particular if high-resistance nickel or nickel-chromium lines are used. To generate a suitable test signal, it is therefore suggested according to the invention that at least one digital amplifier and at least one analog amplifier be connected in series to generate the test voltage. Test signals of the required quality and suitable frequency behavior may thus be generated with relatively high efficiency. According to the invention, two digital amplifier stages are used in particular, whose output signals are fed to an analog amplifier.

The present invention is explained in greater detail in the following on the basis of the attached drawings.

Figure 2:
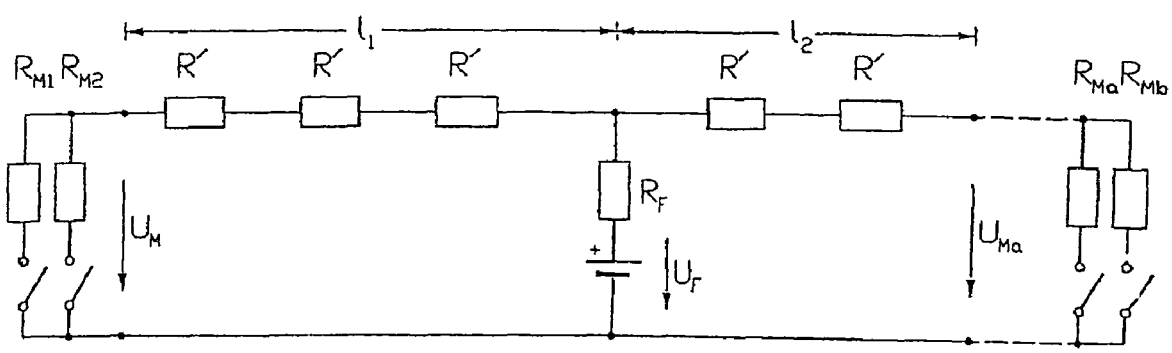
Figure 3:
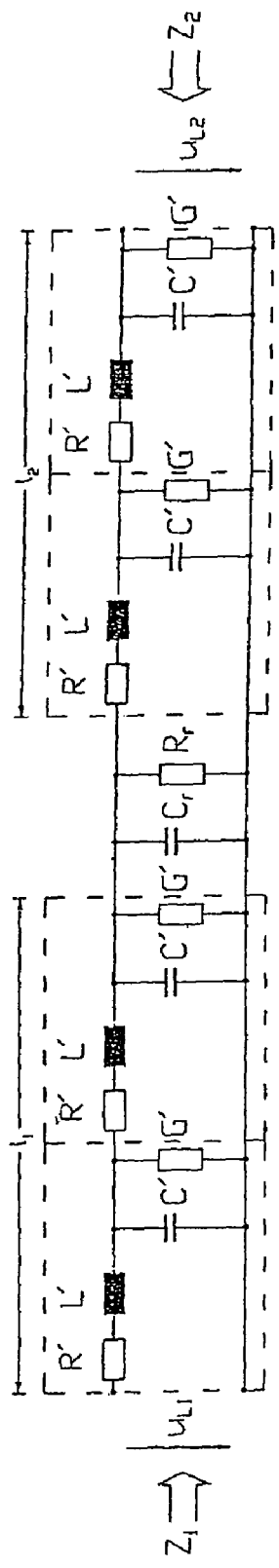
Figure 4:
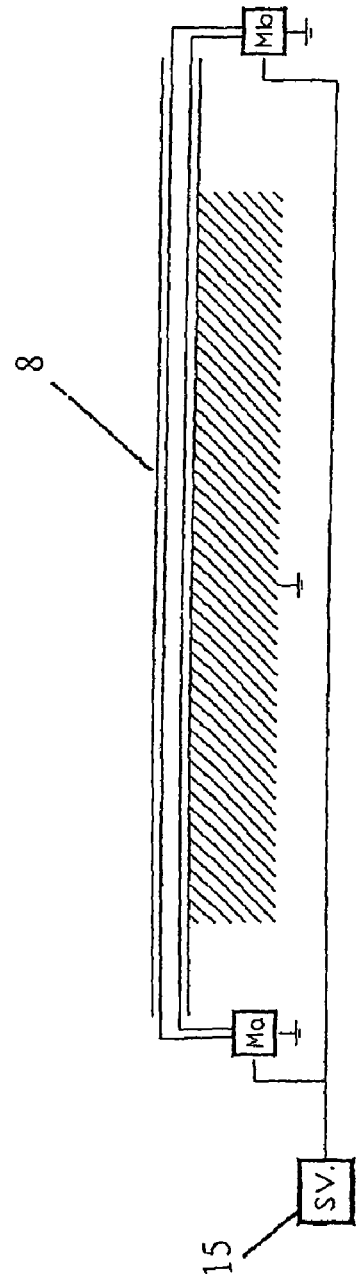
Figure 5:
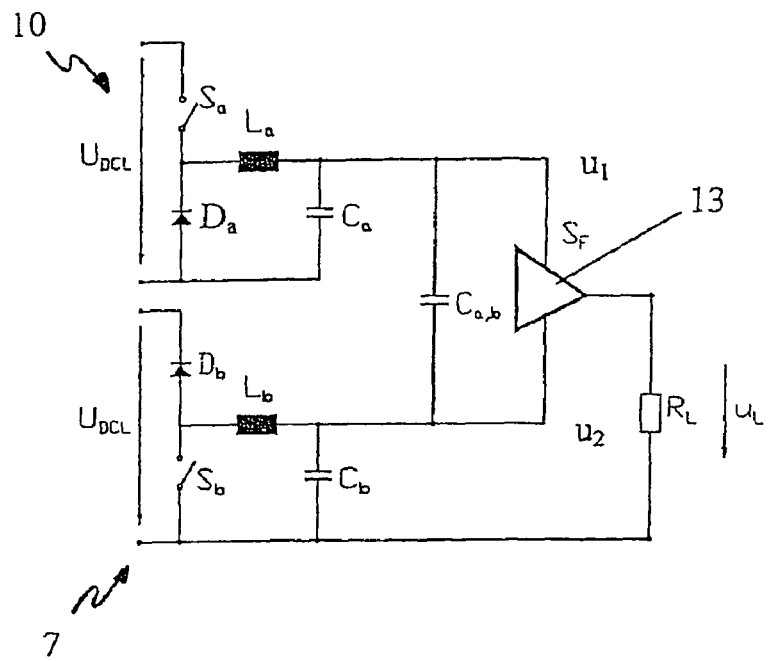
Figure 6:
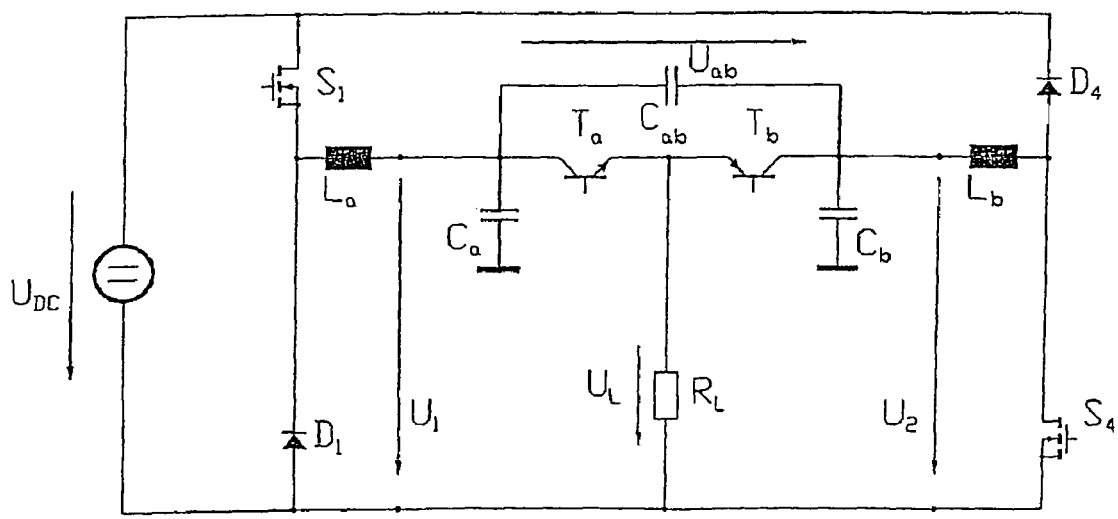
Figure 7:
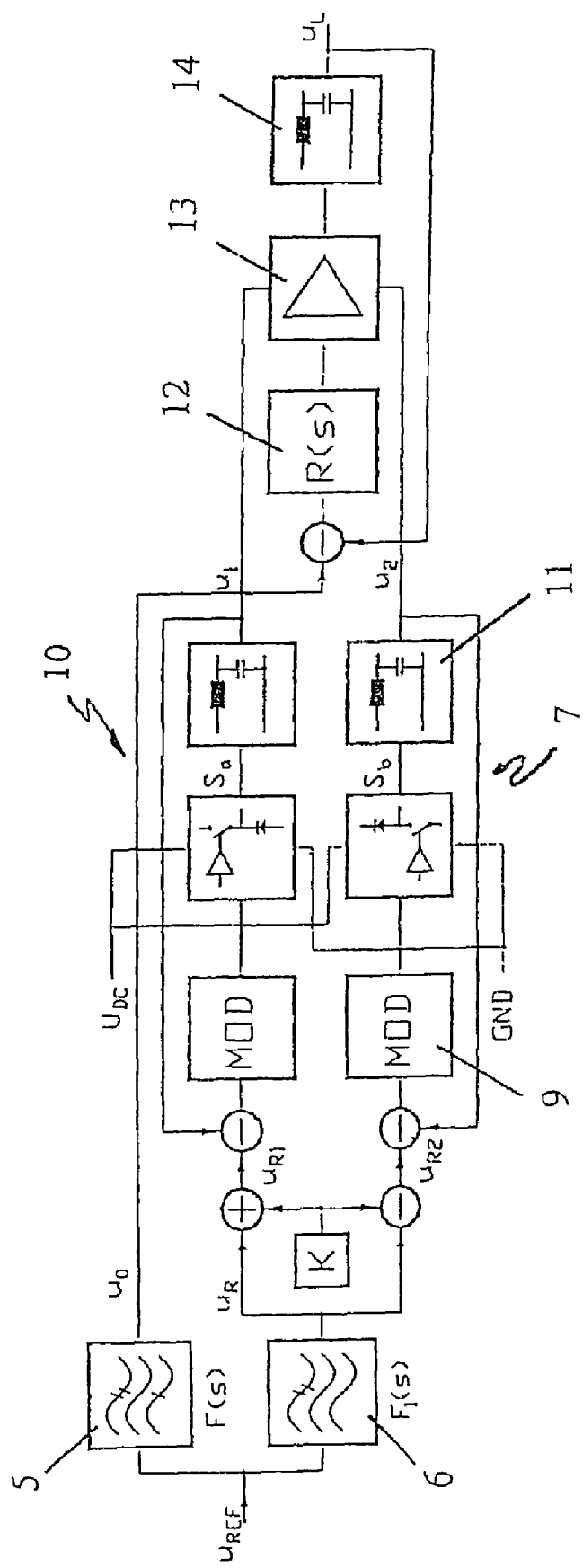

FIG. 1 shows a schematic illustration of a cross-section of a pipe composite having two monitoring conductors, FIG. 2 shows an equivalent circuit diagram for ascertaining the resistance behavior with DC voltage, FIG. 3 shows an equivalent circuit diagram for ascertaining the impedance behavior with AC voltage, FIG. 4 shows a schematic illustration to ascertain the impedance behavior of a pipeline section, FIG. 5 shows a circuit diagram for generating a test signal, FIG. 6 shows an embodiment of an implementation in circuit technology for shaping a test signal, and FIG. 7 shows an embodiment of an implementation in control technology for shaping a test signal.

FIG. 1 shows a schematic illustration of a cross-section of a pipe composite 8, as are widely distributed for transporting liquid or gaseous media. The pipe composite 8 is usually led over large sections so it is accessible with difficulty, e.g., underground. These are waterline pipes or district heating pipes, the transport medium also being able to be provided as a gas in the form of water steam in the latter case. The method according to the present invention is also suitable for monitoring pipelines for transporting media of any type, if the transport medium is electrically conductive, a conductivity of the transport medium of a few µS/cm already being sufficient.

The pipe composite 8 has the pipeline 1, such as a steel or copper pipe, for transporting the liquid or gaseous medium, as well as electrical monitoring conductors 2, which are laid in proximity to the pipeline 1. For this purpose, for example, the pipeline 1 in which the medium is transported is enveloped by a thermally and electrically insulating sheath 3, in which the electrical conductors 2 are embedded, as well as by a water-impermeable protective envelope 4. The thermally and electrically insulating material may be plastic, for example, such as PUR hard foam, glass or rock wool, or a fibrous insulation. In the following, a plastic sheath 3 is assumed.

In the dry state, the plastic sheath 3 has electrically insulating properties. The moistening of the plastic sheath 3 occurring because of the escape of the transport medium reduces the insulation resistance between pipeline 1 and electrical monitoring conductor 2 and/or between the monitoring conductors 2, and thus represents a low-resistance point, the altered electrical conditions being able to be used to recognize and locate the leak.

FIG. 1 shows the use of two monitoring conductors 2, however, the use of only one conductor 2 or also multiple conductors 2 is also conceivable, the positioning of the monitoring conductors 2 within the sheath 3 being able to vary. The monitoring conductors 2 are a high-resistance conductor 2, such as a nickel-chromium conductor, and alternately a low-resistance conductor 2, such as a copper wire or a copper-nickel conductor. The electrical resistance between the high-resistance conductor 2 and the low-resistance conductor 2, and alternately also between the high-resistance conductor 2 and the pipe 1, is monitored. If only one monitoring conductor 2 is used, the electrical resistance between the high-resistance conductor 2 and the conductive pipe 1 is monitored.

As already noted, the present invention is based on the viewpoint that the filler material 3 separating the at least one monitoring conductor 2 and the pipeline 1 represents a dielectric material which changes in the course of time, having complex electrolytic and sometimes electrical properties. A leak changes the dielectric properties significantly, and thus the resistance behavior of the overall system. An equivalent circuit diagram is used to model the electrical properties of the overall system, which is shown in FIG. 2 for DC voltage test signals $U_M$ and the use of only one monitoring line 2, and is shown in FIG. 3 for AC voltage test signals $u_L$.

As may be inferred from FIG. 2, the pipeline section is assumed as a series circuit of resistors R', different section lengths $l_1$ and $l_2$ of the pipeline section being shown with the aid of different numbers of resistors R'. The measurement voltage $U_M$ is applied between conductor 2 and the pipeline 1 at a starting point, and the output voltage $U_{Ma}$ is measured at an end point. The area of the leak is shown as the fault voltage source $U_F$ between pipeline 1 and conductor 2 having the internal resistance $R_F$. By determining the creep resistance, a leak may be recognized, measurement having to be performed both at the starting point and also at the end point for precise location of the leak. If a further monitoring conductor 2 is used, the leak may be located more precisely.

In a similar way, FIG. 3 shows an equivalent circuit diagram if only one monitoring conductor 2 and AC voltage test signals $u_{L1}$ and $u_{L2}$ are used. The pipeline section is modeled by the resistors R', inductive resistors L', and capacitive resistors C' having the induction value G'. Different section lengths $l_1$ and $l_2$ of the pipeline section are again shown with the aid of different numbers of R'L'C' resistor elements. The measurement voltage $u_{L1}$ is applied between conductor 2 and the pipeline 1 at a starting point, and the output voltage is measured at an end point. The area of the leak is shown as a capacitive connection $C_F$ between pipeline 1 and conductor 2 having the resistance $R_F$. The position of the leak in the pipeline system may be concluded from the ratio of the impedance distribution at the starting point and end point of the line. This will be explained in greater detail in the following on the basis of an exemplary embodiment.

FIG. 4 shows a schematic illustration for ascertaining the impedance behavior of a pipeline section which comprises the pipe composite 8. To ascertain the exact fault location by impedance analysis, a measuring device $M_a$ or $M_b$ is attached to a starting point or an end point, respectively, of the pipeline section to be monitored. Both devices $M_a$ and $M_b$ are connected to a server 15 which controls the measurement, and on which the measurement data is analyzed.

For an exact leak location determination, a test signal $U_L$ is emitted alternately by each of the two measuring devices $M_a$ and $M_b$ and analyzed at the particular opposite side of the measurement configuration. For this purpose, the measuring device $M_a$ first generates a test signal $u_{L1}$, and analyzes the impedance distribution at the feed point at the starting point of a pipeline section, where it is coupled in as the feed signal. It is then measured as the first response signal at the end point of the pipeline section. As a function of the first response signal, a second test voltage $u_{L2}$ corresponding to the first test voltage is then generated by the measuring device $M_b$ and coupled in at the end point of a monitoring conductor as the second feed signal. This second feed signal is measured at the starting point as the second response signal. The measured data is transmitted to the analysis unit 15, such as a server, where the correlation of the feed and response signals to the particular test voltages $u_{L1}$, $u_{L2}$ is ascertained and compared to those for the intact pipeline 1.

This procedure may be performed in the scope of a testing program using different test signals $u_L$, in which different parameters of the test signal $u_L$ are varied. For example, different frequencies, voltage amplitudes, pulse times, or pulse patterns may be coupled in within one sequence of the testing program and the corresponding response signals analyzed. The testing program may be repeated at predefined time intervals.

This measuring method is subordinate to an evaluation and analysis program, which may evaluate the line in regard to tightness by evaluating the change of the impedance behavior of the line and by the reaction of the line to adaptively adjusted test signals. In the case of the simpler line state analysis, i.e., establishing a leak without locating it, only a tendency analysis of the impedance response of the configuration is performed. A change which has a tendency to jump, if it occurs outside specific allowed tolerances at nearly all test frequencies with equal tendency, results in error recognition and signaling.

In the fault locating, in contrast to the line state analysis, the fault point is ascertained as the ratio of the particular opposite test response from both sides of the line using test signals in a targeted way. The procedure may be approximately described as follows. If the line state analysis has a fault point, the impedance distribution is determined alternately beginning from both sides of the line. The test signals are adaptively changed in such a way that a representative spectrum may be recorded over the entire test frequency range. The measurement series thus ascertained are statistically related to one another, and the location of the fault point is projected from the ratio of the particular results.

The quality of the method rises in close relationship to the signal quality of the test signals (and their adaptive regulation) and the measurement precision. Resolutions of better than 1% may be implemented in practice using computers. The time curve of the moisture penetration is also logged, because the determination of the precise leak becomes more and more imprecise with increasing moisture in the insulation. A later back-calculation and ascertainment of the actual leak is thus possible.

However, it is also obvious therefrom that the ascertainment of the impedance behavior between starting point and end point of the pipeline section and the conductor 2 not only comprises merely ascertaining an individual impedance value, but rather also ascertaining impedance values at multiple AC voltage amplitudes and frequencies, or variations of the test signal $u_L$ of another type. The particular jump response of the overall system for all of these test cases forms the "impedance behavior" of the overall system, which is first collected with intact pipeline 1.

The impedance behavior between starting point and end point of the conductor 2 and the pipeline 1 is then ascertained repeatedly at arbitrary later times, and compared to the known impedance behavior for the intact pipeline 1, the presence of a leak being concluded from the deviations of the impedance behavior ascertained at arbitrary times to that for the intact pipeline 1. The repetition of the measurement with variation of the test signal $u_L$ allows a possibly occurring leak to be located more and more precisely.

In the course of the evaluation of deviations in the impedance behavior, experiential values which are obtained in the course of the operating life of the pipeline section may also be considered, for example, if cyclic changes or a gradual change of the impedance behavior are observed. The impedance behavior of the overall system will also change in the course of expansions or other modifications of the pipeline section. Thus, for example, the case of a false alarm may be precluded, in which the impedance behavior has changed, but it is clear from the comparison to the impedance behavior with intact pipeline 1 that the change of the impedance behavior is to be attributed to factors other than a pipeline break.

As already noted, impedance detection over a sufficiently large frequency range places special requirements on the test signal $u_L$, a signal generator having correspondingly high peak output being required particularly if high-resistance nickel or nickel-chromium alloys are used. Therefore, a circuit principle as shown in FIG. 5 is suggested to generate a suitable test signal $u_L$, in which two digital amplifiers 7, 10 and an analog amplifier 13 are connected in series to generate the test signal $u_L$, the amplifiers being coupled through a capacitor $C_{a,b}$. The voltage $u_L$ shown in FIG. 5 represents the input voltage for the impedance measurement, i.e., the test signal. In the course of such a multistage system in the form of cascaded analog and digital amplifiers 7, 10, 13, the two digital switching stages 7, 10 first provide the approximate output signal, which is subject to an offset. A linear amplifier 13 then provides the actual output signal $u_L$. Because this amplifier 13 operates at relatively low voltage, the efficiency of the overall system may thus be increased noticeably. The required small-signal bandwidth is determined by the analog amplifier 13, and may thus be set correspondingly high. A circuit as shown in FIG. 5 thus unifies the broadband usability of an analog amplifier 13 with the high efficiency of the digital amplifiers 7, 10. However, it is not precluded that a test signal $u_L$ having the quality required for the method according to the present invention may also be shaped if corresponding digital amplifiers 7, 10 are used even without the suggested analog amplifier stage 13.

A possible implementation in circuit technology of such a cascaded linear/switched amplifier is shown in FIG. 6. The two digital amplifier stages 7, 10 each comprise the switches $S_1$ or $S_4$, which are implemented as transistors, and the diodes $D_1$ or $D_4$. The output voltages $U_1$ and $U_2$ represent the input signal for the analog amplifier, the amplified signal in turn being identified as $u_L$. The circuit is shown for the special case of driving loads in regard to the leak location.

A possible implementation in regulatory technology for shaping a test signal $u_L$ suitable for the method according to the present invention is shown in FIG. 7. A reference voltage $u_{REF}$ is fed to the signal generators 5, 6. The AC voltage $u_R$ shaped by the signal generator 6 is supplied to the two digital amplifier stages 7, 10, a constant value K being able to be added or subtracted to correct for signal errors because of construction tolerances or temperature variations. The resulting signal is identified in FIG. 7 by $u_{R1}$ or $u_{R2}$. The switches $S_{a,b}$ of the digital amplifier stages 7, 10 are controlled by an upstream regulator 9. The amplified signal is supplied to a filter stage 11 in each case. The output voltages of the filter stages 11 are fed back and subtracted from the particular input voltages $u_{R1}$ or $u_{R2}$. The output signal $u_1$ or $u_2$ finally resulting from the particular amplifier stages 7, 10, respectively, is now fed to the analog amplifier 13. The analog amplified signal passes through a filter stage 13, and is fed back to subtract the signal provided by the signal generator 5. The resulting signal passes through a regulation stage 12, and is then used to control amplifier stage 13. Test signals $u_L$ of the required quality and suitable frequency behavior may thus be generated with relatively high efficiency.

The method according to the present invention thus allows leaks in pipelines 1 to be established and located reliably, the monitoring of pipelines 1 being able to be improved and the maintenance costs being able to be minimized in this way.

The invention claimed is:

1. A method for establishing and possibly locating leaks in pipelines (1) for transporting liquid or gaseous media using at least one electrical conductor (2) running along the longitudinal extension of the pipeline (1) from a starting point to an end point, comprising the steps of applying a defined test voltage ($U_m$, $U_L$) in the form of a combined DC/AC voltage between two electrical conductors (2) or between one electrical conductor (2) and the pipeline (1), measuring the resistance and/or impedance behavior between starting and end points of the two conductors (2) or the conductor (2) and the pipeline (1) at multiple DC voltage values and/or multiple AC voltage amplitudes or frequencies and with an intact pipeline (1), measuring the resistance and/or impedance behavior at the same test voltages ($U_m$, $U_L$) at later times, and comparing them to the resistance and/or impedance behavior known for the intact pipeline (1), and detecting the presence of a leak from the deviations of the resistance and/or impedance behavior ascertained at later times from that for the intact pipeline (1).

2. The method according to claim 1, wherein for the case of an AC voltage ($u_L$) as the test voltage ($U_M$, $u_L$), the impedance behavior is measured at both the starting point and also the end point of the at least one electrical conductor (2).

3. The method according to claim 2, wherein a first test voltage ($u_{L1}$) is generated and coupled in as the first feed signal at the starting point of a monitoring conductor (2), a first response signal is measured at the end point, a second test voltage ($u_{L2}$) corresponding to the first test voltage ($u_{L1}$) is generated as a function of the first response signal and coupled in at the end point of a monitoring conductor (2) as the second feed signal, a second response signal is measured at the starting point, and the correlation of the feed and response signals using the particular test voltages ($u_{L1}$, $u_{L2}$) is compared to those for the intact pipeline (2).

4. The method according to claim 3, wherein different test voltages ($u_L$) are run through in the scope of a testing program.

5. The method according to claim 2, wherein at least one digital amplifier (7, 10) and at least one analog amplifier (13) are connected in series to generate the test voltage ($u_L$).

6. The method according to claim 5, wherein two digital amplifier stages (7, 10) are used, whose output signals are fed to an analog amplifier (13).

* * * * *